United States Patent
Zheng et al.

(10) Patent No.: US 12,139,616 B2
(45) Date of Patent: Nov. 12, 2024

(54) METHOD OF MANUFACTURING REACTIVE COMPOSITION AND INK FOR HIGH STABILITY

(71) Applicants: Shanghai Celludye Imaging Colorants Co., Ltd., Shanghai (CN); 3 Wins Digital Technology Co., Ltd., Taoyuan (TW)

(72) Inventors: Wenjun Zheng, Shanghai (CN); Shiau-Yin Chang, Taoyuan (TW)

( * ) Notice: Subject to any disclaimer, the term of this patent is extended or adjusted under 35 U.S.C. 154(b) by 856 days.

(21) Appl. No.: 17/239,708

(22) Filed: Apr. 26, 2021

(65) Prior Publication Data
US 2021/0332246 A1    Oct. 28, 2021

(30) Foreign Application Priority Data
Apr. 27, 2020 (TW) ................... 109114040

(51) Int. Cl.
*C09B 67/00* (2006.01)
*C09B 62/513* (2006.01)
*C09B 67/22* (2006.01)
*C09B 67/24* (2006.01)
*C09D 11/328* (2014.01)
*C09B 67/54* (2006.01)

(52) U.S. Cl.
CPC .......... *C09B 67/005* (2013.01); *C09B 62/513* (2013.01); *C09B 67/0072* (2013.01); *C09D 11/328* (2013.01); *C09B 67/0096* (2013.01)

(58) Field of Classification Search
CPC . C09B 67/005; C09B 62/513; C09B 67/0072; C09B 67/0096; C09B 62/06; C09B 67/0047; C09D 11/328; C09D 11/38; D06P 5/30

USPC ............................................................ 8/543
See application file for complete search history.

(56) References Cited

U.S. PATENT DOCUMENTS

| | | | |
|---|---|---|---|
| 5,085,668 A | | 2/1992 | Pelster et al. |
| 5,528,518 A | * | 6/1996 | Bradshaw ............ G09B 29/106 |
| | | | 702/158 |
| 2020/0115557 A1 | * | 4/2020 | Vriezema ................... D06P 5/30 |

FOREIGN PATENT DOCUMENTS

| | | | | | |
|---|---|---|---|---|---|
| CN | | 102382486 A | * | 3/2012 | ............. C09B 67/22 |
| CN | | 108690371 A | * | 10/2018 | ............. D09P 1/384 |
| WO | WO 2018203746 A1 | | * | 11/2018 | ............. C09B 67/22 |

* cited by examiner

*Primary Examiner* — Eisa B Elhilo
(74) *Attorney, Agent, or Firm* — Bruce Stone LLP; Joseph A. Bruce

(57) ABSTRACT

The present invention provides a method of manufacturing a reactive composition: (a) dissolving 2-[(4-aminophenyl) sulfonyl]ethanesulfonic acid in water to form a solution; (b) introducing excess nitrite or excess nitrous acid and the solution into an acid solution to form a diazonium salt; (c) adding 4-amino-5-hydroxy-2,7-naphthalenedisulfonic acid to react with the diazonium salt; (d) adding 7-acetamido-4-hydroxy-2-naphthalenesulfonic acid to react with the diazonium salt; (e) adding a first alkaline substance to adjust a pH value; (f) adding a second alkaline substance to adjust the pH value; (g) adding a third alkaline substance to control the pH value; (h) adding an acidic substance to adjust the pH value; and (i) adding an additive agent to obtain the reactive composition, wherein the additive agent is acetic acid, sodium hydroxide, acetate, sulfonic acid buffering agent, or a combination thereof.

6 Claims, 1 Drawing Sheet

Table 5. The influence of different additive agents on the stability of 10% vinyl sulfone black dyes KN-A and KN-B during high temperature aging at 60°C

| Sample No. | | 0.2wt. % HEPES | | HPLC purity | | 0.2wt. % TES | | HPLC purity | | Original HPLC purity | |
|---|---|---|---|---|---|---|---|---|---|---|---|
| | | Before aging | After aging | vinyl sulfone | hydroxyethyl sulfone | Before aging | After aging | vinyl sulfone | hydroxyethyl sulfone | vinyl sulfone | hydroxyethyl sulfone |
| Black CP-VS | KNA-1-9 | 7.52 | 4.15 | 47.4% | 44.7% | 7.50 | 3.96 | 46.6% | 45.0% | 88.5% | 8.8% |
| | KNB-1-9 | 7.51 | 7.38 | 90.2% | 7.8% | 7.50 | 7.40 | 90.6% | 8.0% | 94.7% | 3.5% |
| Black CP-VS03 | KNA-2-10 | 7.50 | 4.23 | 54.9% | 40.8% | 7.50 | 4.04 | 54.3% | 40.1% | 88.7% | 8.9% |
| | KNB-2-10 | 7.53 | 7.41 | 89.8% | 7.7% | 7.52 | 7.46 | 90.1% | 7.6% | 94.6% | 3.8% |
| Black CP-VS04 | KNA-3-11 | 7.52 | 4.17 | 63.7% | 31.9% | 7.51 | 3.97 | 63.2% | 32.3% | 88.2% | 10.1% |
| | KNB-3-11 | 7.53 | 7.49 | 90.5% | 7.6% | 7.52 | 7.43 | 89.7% | 8.4% | 94.8% | 3.7% |

Table 5. The influence of different additive agents on the stability of 10% vinyl sulfone black dyes KN-A and KN-B during high temperature aging at 60°C

| Sample No. | | 0.2wt. % HEPES | | HPLC purity | | 0.2wt. % TES | | HPLC purity | | Original HPLC purity | |
|---|---|---|---|---|---|---|---|---|---|---|---|
| | | Before aging | After aging | vinyl sulfone | hydroxyethyl sulfone | Before aging | After aging | vinyl sulfone | hydroxyethyl sulfone | vinyl sulfone | hydroxyethyl sulfone |
| Black CP-VS | KNA-1-9 | 7.52 | 4.15 | 47.4% | 44.7% | 7.50 | 3.96 | 46.6% | 45.0% | 88.5% | 8.8% |
| | KNB-1-9 | 7.51 | 7.38 | 90.2% | 7.8% | 7.50 | 7.40 | 90.6% | 8.0% | 94.7% | 3.5% |
| Black CP-VS03 | KNA-2-10 | 7.50 | 4.23 | 54.9% | 40.8% | 7.50 | 4.04 | 54.3% | 40.1% | 88.7% | 8.9% |
| | KNB-2-10 | 7.53 | 7.41 | 89.8% | 7.7% | 7.52 | 7.46 | 90.1% | 7.6% | 94.6% | 3.8% |
| Black CP-VS04 | KNA-3-11 | 7.52 | 4.17 | 63.7% | 31.9% | 7.51 | 3.97 | 63.2% | 32.3% | 88.2% | 10.1% |
| | KNB-3-11 | 7.53 | 7.49 | 90.5% | 7.6% | 7.52 | 7.43 | 89.7% | 8.4% | 94.8% | 3.7% |

METHOD OF MANUFACTURING REACTIVE COMPOSITION AND INK FOR HIGH STABILITY

CROSS-REFERENCE TO RELATED APPLICATION

This application claims the benefit of Taiwan Patent Application No. 109114040, filed on Apr. 27, 2020, in the Taiwan Intellectual Property Office of the R.O.C, the disclosure of which is incorporated herein in its entirety by reference.

FIELD OF INVENTION

The present invention relates to a method of manufacturing dye composition and ink. In particular, it relates to a method of manufacturing reactive dye composition and ink for high stability.

BACKGROUND OF THE INVENTION

Digital printing is a non-contact printing method. Compared with conventional printing method, such as flat screen printing or rotary screen printing, it has significant advantages. However, digital printing differs from conventional printing in terms of color depth, especially for black depth, where a big gap exists. For the reactive ink used in digital printing on cotton fabrics, the way to increase the black depth is by changing the ink composition or more specifically by selecting reactive dye with high color intensity.

Current reactive inks usually use reactive dyes with monochlorotriazine (MCT). Compared with other types of reactive dyes, such reactive dyes are more stable in the aqueous system, and the reactive ink made by it is more suitable for long-term storage. The black is a disazo dye made with C.I. reactive black 39 as the main component. However, the disadvantage of this type of reactive dye is that it does not provide a good color depth, especially black.

In contrast, reactive dyes based on a reactive group of ethyl sulfone sulfate, especially black, have a good color depth. Such black reactive dyes usually have Reactive Black 5 (C.I. Reactive Black 5) as the main component. The orange reactive dye, which is also made by ethyl sulfone sulfate, is a toning component. Deep black color is obtained after mixing with it. Some patents disclosed deep black dyes that are a mixture of reactive black 5 and reactive orange 78 for textile dyeing. Another patent further disclosed the "one-pot" preparation process for producing a dye mixture. The process can improve the product yield, reduce the content of impurities, and can eliminate the intermediate separation and purification process, so that the dye can be obtained efficiently. However, the dyes obtained by this method are unstable in an aqueous system since ethyl sulfone sulfate is attacked by —OH in water, and sulfuric acid is released, as shown in the following chemical formula:

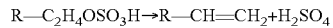

$$R-C_2H_4OSO_3H \rightarrow R-CH=CH_2 + H_2SO_4$$

Continuous acid release lowers pH of the ink and increases the sulfate ion significantly. Over time, pH of the final ink will fall below 3. In the worst cases, the pH is reduced to about 1.0, which would cause corrosion on the coating of the nozzle surface and the nozzle itself, making the printing process difficult to continue.

Therefore, how to obtain a black dye that is stable in an aqueous system and has the color depth of ethyl sulfone sulfate reactive dye has become an urgent need. Surprisingly, the sulfate is removed from ethyl sulfone sulfate under alkaline conditions, and the resulting vinyl sulfone has good stability, such as the following Reactive Black 5:

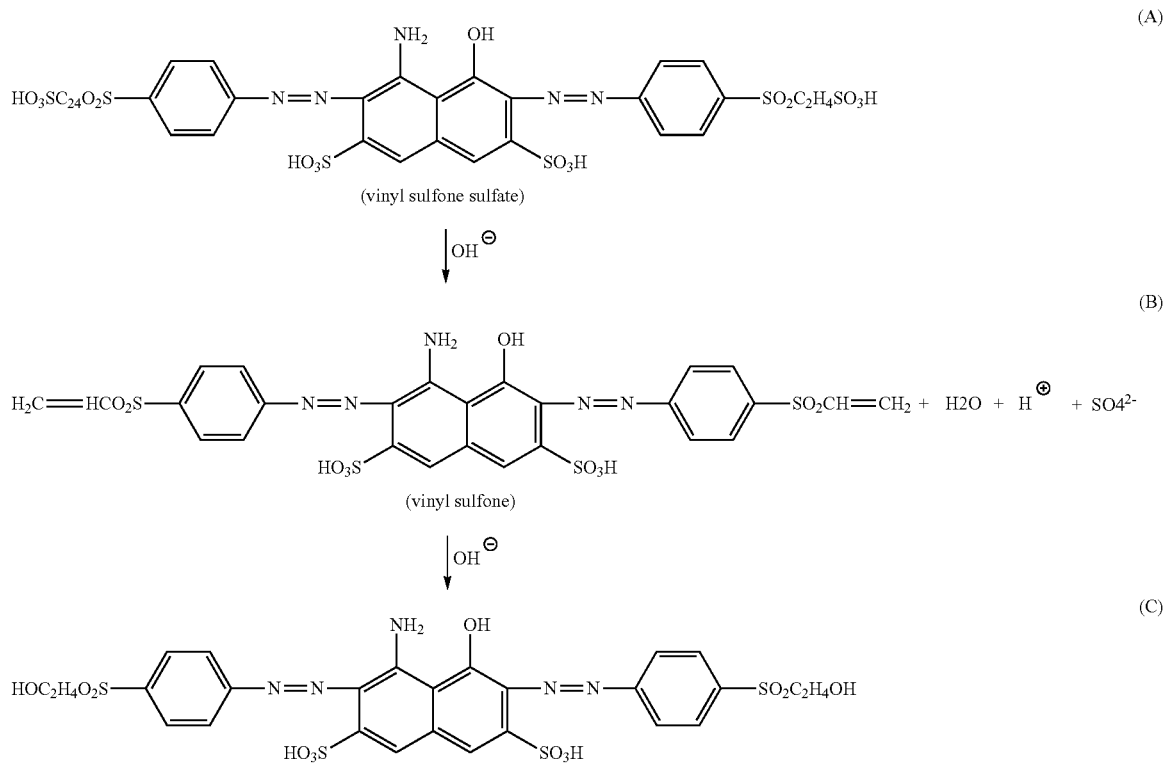

Hydrolyzed Dye (B) It is the aforementioned vinyl sulfone structure. It is still what the person having ordinary skill in the art called "reactive dye". Under certain condition (102° C., 8 minutes), it reacts with cellulose as follows:

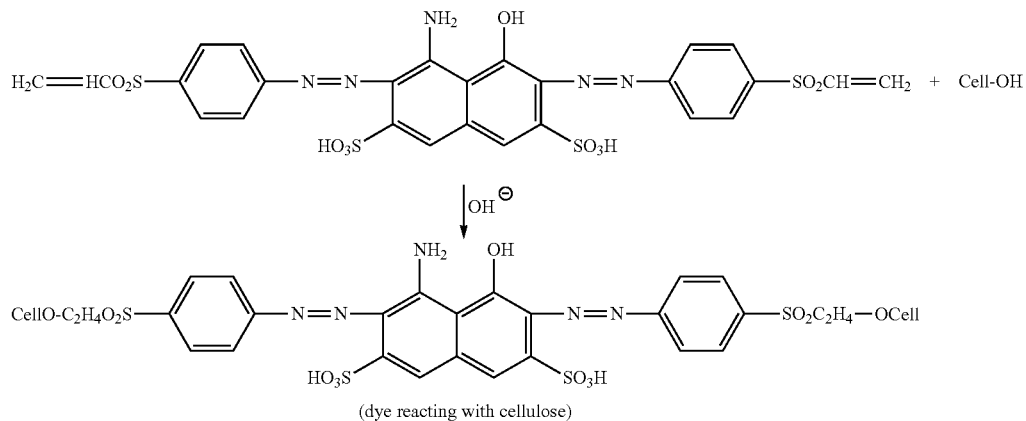

(dye reacting with cellulose)

Therefore, how to obtain a black dye that is stable in an aqueous system and having the color depth of ethyl sulfone reactive dye has become an urgent need.

The vinyl sulfone typed reactive dye is obtained by "deesterification". The inorganic salts and small molecule organic compound impurities contained in the dye solution can be removed to further increase the purity by the reverse osmosis process.

From the perspective of application technology, printing inks should have different characteristics from other inks. In addition to viscosity, stability, surface tension and fluidity of the dye composition, the quality of the printed fabric should also meet high requirements, such as color strength, fixation, fiber-dye bonding stability, anti-aging and anti-fading, etc.

With the development of inkjet printing technology, inkjet printing technology has developed rapidly in recent years, and the performance requirements of ink for inkjet printing are becoming higher and higher. The decisive influence on the performance of the ink is the quality of the dye. The quality of the dye directly determines the stability of the inkjet ink and the printing fluency, which places extremely high requirements on the inkjet dye.

Ink composition used for inkjet printing contains water-soluble dyes or water-dispersible pigments; wherein these dyes or pigments can be dissolved or dispersed in water, or dissolved in a water-soluble organic solvent. In addition, a surfactant can also be added to the ink composition to change the characteristics of the ink and make it meet the needs of textile inkjet printing.

However, by referring to the current dye technology or patent thereof, there are still some problems: (1) the stability of ink storage and long-term printing are not good, and there is a problem of nozzle clogging; (2) Color strength of ink and solubility of dyes still need to be improved; (3) the solubility or stability of dyes is not good.

Therefore, in the current digital reactive ink composition for printing and dyeing, it's necessary to provide a dye composition with high pH stability, low fixation decline, high color strength and high dye concentration, etc.

The above information disclosed in this section is only for enhancement of understanding of the background of the described technology and therefore it may contain information that does not form the prior art that is already known to a person of ordinary skill in the art.

SUMMARY OF THE INVENTION

In order to make up for the deficiencies of the conventional technology, the present invention provides a method for preparing a reactive composition, which can be used as a dye and maintains its stability in a wide pH range. The pH value of the dye is not more than 7.5, and the best pH range is 6.5-7.5.

The present invention provides a method of manufacturing a reactive composition, comprising: (a) dissolving 2-[(4-aminophenyl)sulfonyl]ethanesulfonic acid into water to form a solution; (b) introducing excess nitrite or nitrous acid and the solution into acid solution to form a diazonium salt; (c) adding 4-amino-5-hydroxy-2,7-naphthalenedisulfonic acid to react with the diazonium salt; (d) adding 7-acetamido-4-hydroxy-2-naphthalenesulfonic acid to react with the diazonium salt; (e) adding a first alkaline substance to adjust a pH value; (f) adding a second alkaline substance to adjust the pH value; (g) adding a third alkaline substance to control the pH value; (h) adding an acidic substance to adjust the pH value; and (i) adding an additive agent to obtain the reactive composition, wherein the additive agent is acetic acid, sodium hydroxide, acetate, sulfonic acid buffering agent, or a combination thereof.

In the embodiment of the present invention, the nitrite is sodium nitrite.

In the embodiment of the present invention, the acid solution is hydrochloric acid.

In the embodiment of the present invention, the reaction temperature is lower than 5° C.

In the embodiment of the present invention, the first alkaline substance is sodium bicarbonate and the pH value is adjusted to 2.0-2.2 in the step (e).

In the embodiment of the present invention, the second alkaline substance is sodium carbonate and the pH value is adjusted to 5.2-5.5 in the step (f).

Moreover, the reactive composition is processed by a spray drying technology to obtain a powder composition.

In the embodiment of the present invention, the third alkaline substance is sodium hydroxide and the pH value is controlled no more than 11 in the step (g).

In the embodiment of the present invention, the acidic substance is hydrochloric acid and the pH value is adjusted to 6.0-6.5 in the step (h).

In the embodiment of the present invention, a pH value of the reactive composition is ranged 6.5-7.5.

The method of manufacturing a reactive composition further comprises after dilution, filtering with Buchner funnel, then with 1.5 micron glass fiber membrane, processing desalination with ultrafiltration membrane and concentration with nanofiltration membrane to a solid content of 10 wt. %, thereby obtaining the final refined product.

The present invention also provides a method of manufacturing a reactive ink, comprising: (a) providing the aforementioned reactive composition; and (b) mixing an antibacterial agent, a surfactant, ethylene glycol, 1,2-propanediol, glycerin, caprolactam, diethylene glycol, a sulfonic acid buffering agent or a combination thereof with the reactive composition to form the reactive ink.

In the embodiment of the present invention, a pH value of the reactive ink is ranged 7.0-8.0.

In the embodiment of the present invention, a concentration of free chloride ion and free sulfate ion are respectively lower than 50 ppm.

Many of the attendant features and advantages of the present invention will become better understood with reference to the following detailed description considered in connection with the accompanying tables.

BRIEF DESCRIPTION OF THE DRAWINGS

The drawing illustrates the Table 5 of the embodiment in the present invention.

DETAILED DESCRIPTION OF THE PREFERRED EMBODIMENTS

Reference will now be made in detail to the exemplary embodiments of the present invention. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art.

For convenience, certain terms employed in the specification, examples and appended claims are collected here. Unless defined otherwise, all technical and scientific terms used herein have the same meaning as commonly understood by one of the ordinary skill in the art to which this invention belongs. In addition, unless otherwise specified, the percentage of additive agent (%) in the embodiments refers to weight percentage.

The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments. It should be noted that although the following embodiments are prepared using C.I. reactive black No. 5 dye for ink preparation, the effect of the substance is not intended to limit the scope of the present invention. Generally, all reactive dyes or all reactive compositions selected from the color index can be used in the present invention.

The singular forms "a", "and", and "the" are used herein to include plural referents unless the context clearly dictates otherwise.

The following descriptions are provided to elucidate a method of manufacturing reactive composition and ink for high stability and to aid it of skilled in the art in practicing this invention. These embodiments are merely exemplary embodiments and in no way to be considered to limit the scope of the invention in any manner.

Material and Method (a) 76.99 g of 2-[(4-aminophenyl)sulfonyl]ethanesulfonic acid (vinyl sulfone parabase ester, Cas. 2494-89-5) (100% basis, 0.2740 mol) was added to 100 ml of water and 100 g of ice, then mixed for 4 hours.

(b) 19.1 g of sodium nitrite ($NaNO_2$, 100% basis, 0.277 mol) was dissolved in 50 ml of water. Wherein the main purpose of this step is to use excessive nitrous acid or nitrite to diazotize the para-vinyl sulfide ester.

(c) 50 g of ice was added to the para-vinyl sulfide ester solution prepared in step (a) to lower the temperature close to 0° C. An acidic solution was also added, which includes but is not limited to inorganic acids, such as 10 g of hydrochloric acid (0.274 mol). The sodium nitrite solution prepared in step (b) was added within 15 minutes, and the temperature is controlled under 5° C. to generate diazonium salt and remaining nitrite. The molar ratio between the nitrite and the para-vinyl sulfide ester is about 1.02:1~1.05:1. During the process, it was repeatedly tested with Congo red test strips and dark blue was presented. After that, a small amount of sulfamic acid (Casamic 5329-14-6) was used to remove the remaining sodium nitrite to stop the reactivity of the remaining sodium nitrite. The process was tested with potassium iodide starch test paper and light blue was presented, indicating that nitrite has been completely removed.

(d) 34.1 g of 4-amino-5-naphthol-2,7-disulfonic acid (H-acid, Cas no. 5460-09-3) (100% basis, 0.1 mole) was added to diazonium salt prepared in the step (c) and the temperature was raised to 13-14° C.; wherein the molar ratio of the diazonium salt and H acid is about 1.01:1~1.03:1.

(e) 19.04 g of 7-acetamido-4-hydroxy-2-naphthalenesulfonic acid (acetoxy-J-acid, Cas no. 6334-97-0) was added into 50 ml of water and stirred for 1 hour; wherein the molar ratio of the diazonium salt and the J acid is about 1.01:1~1.03:1.

(f) About 50 g of ice was added into the solution obtained in step (d), and the acetyl-J-acid solution obtained in step (e) was added to react with the remaining diazonium salt, and the temperature was controlled at 5-8° C. Next, a first alkaline substance, including but not limited to 25.31 g of sodium bicarbonate ($NaHCO_3$, 0.3014 mol) was added to adjust the pH to 2.0-2.2, maintaining the temperature at 5-8° C., and the second alkaline substance was used within 30 minutes, including but not limited to 15% of sodium carbonate ($Na_2CO_3$) solution, to adjust the pH to 5.2-5.5. In the late stage of the reaction, the pH would slowly rise to 6-6.5, and the resulting conjugate is a reactive black mixture dye (also known as KN-A vinyl sulfone black dye), which has good stability. The powder dye can be obtained by spray drying.

The KN-A vinyl sulfone black dyes prepared in steps (a) to (f) would be used in the following examples of the present invention, and additive agents were added to evaluate its anti-aging effect.

(g) 10.96 g of the third alkaline substance, including but not limited to caustic soda (NaOH), was dissolved in 100 ml of water.

(h) The KN-A vinyl sulfone black dye obtained in the step (f) is adjusted to pH=7.0 by a small amount of 10% liquid caustic soda. The prepared NaOH solution in the reaction step (g) was added to the above-mentioned conjugate within 1-1.5 hours, the pH was controlled to no more than 11, and the reaction was stirred for 15 minutes. An acidic substance was used, including but not limited to diluted hydrochloric acid, to quickly adjust the pH to 6.0-6.5, and the reaction came to end. A vinyl sulfone black dye mixture with removed sulfate (also known as KN-B vinyl sulfone black dye) is obtained. It has good stability, and its powder dye can also be obtained by spray drying.

The KN-B vinyl sulfone black dye prepared by steps (a) to (h) will be used in the following examples of the present invention, and additive agents were added to evaluate its anti-aging effect.

It should be noted that the above-mentioned acidic solutions, alkaline substances and acidic substances, etc., are only exemplary examples, and the application is not limited to those types.

Example 1

In this embodiment, KN-A and KN-B vinyl sulfone black dyes were subjected to high temperature aging at 60° C. for 7 days. The results are shown in Table 1. The pH value of KN-B dyes decreased less and the pH value was around 6.0. The concentration of dissociated chloride ions and sulfate ions from KN-B was relatively less than from KN-A, which represents that KN-B has higher stability.

TABLE 1

Changes in pH and stability of vinyl sulfone black dyes KN-A and KN-B during high temperature aging at 60° C.

| Sample No. | | Dye Concentration | Solution Weight | Before Aging | | | After Aging (at 60° C. for 7 days) | | | |
|---|---|---|---|---|---|---|---|---|---|---|
| | | | | pH | Cl (ppm) | $SO_4$ (ppm) | pH | ΔpH | Cl (ppm) | $SO_4$ (ppm) |
| Black CP-VS | KNA-1 | 10% | 50 g | 4.85 | / | / | 3.97 | −0.88 | 80 | 14490 |
| | KNB-1 | | | 6.24 | / | / | 5.78 | −0.46 | 16 | 52 |
| Black CP-VS03 | KNA-2 | | | 5.10 | / | / | 3.35 | −1.75 | 90 | 17910 |
| | KNB-2 | | | 6.32 | / | / | 5.83 | −0.49 | 10 | 33 |
| Black CP-VS04 | KNA-3 | | | 5.68 | / | / | 3.54 | −2.14 | 185 | 330 |
| | KNB-3 | | | 6.51 | / | / | 6.16 | −0.35 | 3 | 18 |

CP-VS03 is reddish shade black, and CP-VS04 is bluish shade black.

Example 2

This embodiment was based on three KN-A and KN-B vinyl sulfone black dyes including different additive agents before and after spray drying. The pH change and dye stability were observed. Please see table 2 and table 3. It should be noted that the weight percentage of additive agents is based on the total weight of the dye.

TABLE 2

Acetic acid/sodium hydroxide effect on the stability change of vinyl sulfone black dyes KN-A and KN-B during high temperature aging at 60° C.

| Sample No. | | Dye Concentration | Solution Weight | HAc/NaOH 10% | Before Aging | | | After Aging (at 60° C. for 7 days) | | | |
|---|---|---|---|---|---|---|---|---|---|---|---|
| | | | | | pH | Cl (ppm) | $SO_4$ (ppm) | pH | ΔpH | Cl (ppm) | $SO_4$ (ppm) |
| Black CP-VS | KNA-1-1 | 10% | 50 g | 0.258 g HAc | 4.5 | / | / | 3.75 | −0.75 | 74 | 12520 |
| | KNB-1-1 | | | 0.179 g HAc | 6.0 | / | / | 5.68 | −0.32 | 13 | 48 |
| Black CP-VS03 | KNA-2-1 | | | 0.105 g NaOH | 6.0 | / | / | 4.45 | −1.55 | 88 | 16690 |
| | KNB-2-1 | | | 0.093 g NaOH | 6.5 | / | / | 6.13 | −0.37 | 7 | 24 |
| Black CP-VS04 | KNA-3-1 | | | 0.011 g NaOH | 6.0 | / | / | 4.01 | −1.99 | 179 | 292 |
| | KNB-3-1 | | | / | 6.5 | / | / | 6.36 | −0.14 | 1 | 10 |

TABLE 3

Sodium acetate effect on the stability change of vinyl sulfone
black dyes KN-A and KN-B during high temperature aging at 60° C.

|  | Sample No. | Dye Concentration | Solution Weight | Sodium Acetate | Before Aging | | | After Aging (at 60° C. for 7 days) | | | |
|---|---|---|---|---|---|---|---|---|---|---|---|
|  |  |  |  |  | pH | Cl (ppm) | $SO_4$ (ppm) | pH | ΔpH | Cl (ppm) | $SO_4$ (ppm) |
| Black CP-VS | KNA-1-2 | 10% | 50 g | 0.1% | 4.5 | / | / | 4.41 | −0.09 | 53 | 12443 |
| Black CP-VS | KNB-1-2 |  |  | 0.4% | 6.5 | / | / | 6.21 | −0.29 | 5 | 26 |
| Black CP-VS03 | KNA-2-2 |  |  | 0.8% | 6.0 | / | / | 4.98 | −1.02 | 63 | 16536 |
| Black CP-VS03 | KNB-2-2 |  |  | 0.2% | 6.5 | / | / | 6.36 | −0.14 | 12 | 23 |
| Black CP-VS04 | KNA-3-2 |  |  | 0.1% | 6.0 | / | / | 5.15 | −0.85 | 166 | 283 |
| Black CP-VS04 | KNB-3-2 |  |  | 0.2% | 7.0 | / | / | 6.88 | −0.12 | 7 | 16 |

It can be seen from Tables 2 to 3 that acetic acid and sodium hydroxide had a negative effect on the stability of the KN-A vinyl sulfone black dye. With the increase of the amount, the pH drops a lot, and the enhanced concentration of chloride and sulfate ions indicated that the dye has accelerated aging. Although it also has a negative effect on the KN-B vinyl sulfone black dye, the pH difference was less than 0.4, and both concentration of chloride ion and sulfate ion were less than 50 ppm. When the acetic acid/sodium hydroxide buffer solution was added with sodium acetate to enhance the buffering effect, KN-B vinyl sulfone black dyes CP-VS03 and CP-VS04 only need to add 0.2% sodium acetate to achieve stability at high temperature. The pH was maintained between 6.3-7.0, and the KN-A vinyl sulfone black dye CP-VS with 0.1% sodium acetate shows the smallest pH variation, and the concentration of chloride ion and sulfate ion was relatively low, indicating that the dye was relatively stable at pH=4.5.

TABLE 4

The influence of diluted hydrochloric acid or sodium hydroxide on the stability
of 10% vinyl sulfone black dye KN-B during high temperature aging at 60° C.

| Sample No. | | Original pH | Aging at high temperature 60° C. for 7 days | | | | | | | Purity of HPLC | |
|---|---|---|---|---|---|---|---|---|---|---|---|
|  |  |  | 1st day | 2nd day | 3rd day | 4th day | 5th day | 6th day | 7th day | vinyl sulfone | hydroxyethyl sulfone |
| Black CP-VS | KNB-1-3 | 4 | 4.05 | 4.05 | 4.02 | 4.03 | 4.03 | 4.02 | 4.03 | 94.7% | 3.73% |
| Black CP-VS03 | KNB-2-3 | 4 | 4.04 | 4.04 | 4.04 | 4.03 | 4.03 | 4.03 | 4.03 | 94.5% | 3.52% |
| Black CP-VS04 | KNB-3-3 | 4 | 4.05 | 4.05 | 4.05 | 4.04 | 4.03 | 4.04 | 4.04 | 94.9% | 3.28% |
| Black CP-VS | KNB1-4 | 5 | 4.94 | 4.87 | 4.85 | 4.84 | 4.82 | 4.80 | 4.80 | 94.4% | 3.64% |
| Black CP-VS03 | KNB-2-4 | 5 | 5.01 | 5.00 | 5.00 | 5.00 | 4.95 | 4.93 | 4.93 | 94.5% | 3.82% |
| Black CP-VS04 | KNB-3-4 | 5 | 5.00 | 5.00 | 5.00 | 4.97 | 4.98 | 4.96 | 4.96 | 94.8% | 3.20% |
| Black CP-VS | KNB-1-5 | 6 | 6.01 | 6.00 | 6.02 | 6.00 | 5.97 | 5.97 | 5.96 | 94.6% | 3.30% |
| Black CP-VS03 | KNB-2-5 | 6 | 6.01 | 6.00 | 6.00 | 5.99 | 5.97 | 5.98 | 5.97 | 94.9% | 3.15% |
| Black CP-VS04 | KNB-3-5 | 6 | 6.02 | 6.01 | 6.01 | 6.00 | 6.00 | 5.98 | 5.96 | 94.8% | 3.24% |
| Black CP-VS | KNB-1-6 | 7 | 7.00 | 7.00 | 6.98 | 6.99 | 6.96 | 6.96 | 6.95 | 94.1% | 3.80% |
| Black CP-VS03 | KNB-2-6 | 7 | 7.01 | 7.00 | 7.00 | 7.00 | 6.98 | 6.97 | 6.97 | 94.5% | 3.63% |
| Black CP-VS04 | KNB-3-6 | 7 | 7.01 | 7.00 | 7.01 | 7.00 | 7.00 | 6.98 | 6.99 | 94.7% | 3.48% |
| Black CP-VS | KNB-1-7 | 8 | 8.00 | 8.01 | 7.97 | 7.97 | 7.96 | 7.95 | 7.95 | 94.2% | 3.73% |
| Black CP-VS03 | KNB-2-7 | 8 | 8.01 | 8.00 | 8.00 | 7.98 | 7.99 | 7.96 | 7.96 | 94.7% | 3.41% |
| Black CP-VS04 | KNB-3-7 | 8 | 8.01 | 8.00 | 7.99 | 7.97 | 7.97 | 7.96 | 7.96 | 94.9% | 3.16% |
| Black CP-VS | KNB-1-8 | 9 | 8.97 | 8.95 | 8.95 | 8.92 | 8.91 | 8.90 | 8.87 | 93.9% | 4.18% |

TABLE 4-continued

The influence of diluted hydrochloric acid or sodium hydroxide on the stability
of 10% vinyl sulfone black dye KN-B during high temperature aging at 60° C.

| Sample No. | | Original pH | Aging at high temperature 60° C. for 7 days | | | | | | | Purity of HPLC | |
|---|---|---|---|---|---|---|---|---|---|---|---|
| | | | 1st day | 2nd day | 3rd day | 4th day | 5th day | 6th day | 7th day | vinyl sulfone | hydroxyethyl sulfone |
| Black CP-VS03 | KNB-2-8 | 9 | 8.98 | 8.95 | 8.94 | 8.95 | 8.93 | 8.93 | 8.89 | 93.5% | 4.63% |
| Black CP-VS04 | KNB-3-8 | 9 | 8.98 | 8.94 | 8.93 | 8.91 | 8.91 | 8.88 | 8.86 | 93.6% | 4.70% |

300 g of KN-B vinyl sulfone black dye powder was diluted to 3000 ml solution, which was filtered through a Buchner funnel, equipped with ultrafiltration membrane for desalination, and nanofiltration membrane for concentration to a solid content of 10% to obtain the final refined product. The diluted hydrochloric acid or liquid caustic soda was used to adjust the pH of the refined product to 4, 5, 6, 7, 8, 9, and perform a high temperature aging test at 60° C. for 7 days. The pH value was tested every day. At the end, the HPLC purity was tested.

It can be seen from Table 4 that after high-temperature aging of KN-B vinyl sulfone black dyes at different pH values, the changes in pH value after aging were all the same, the HPLC purity did not change significantly, and the difference was very small. At pH=9, the hydroxyethyl sulfone increased slightly, indicating that the dye itself was stable under various pH conditions.

300 grams of KN-A and KN-B vinyl sulfone black dye powders were diluted to 3000 ml solutions, and were filtered with a Buchner funnel, equipped with ultrafiltration membrane for desalination, and nanofiltration membrane for concentration to 10% solid content to obtain the final refined product. 0.2 wt. % of HEPES (4-(2-Hydroxyethyl)-1-piperazine ethanesulfonic acid) and TES (N-[Tris(hydroxymethyl)methyl]-2-aminoethanesulfonic acid) were respectively added according to Table 5 (shown in the drawing), then diluted liquid caustic was used to adjust the pH to 7.5, and a high temperature aging experiment was conducted at 60° C. for 7 days to detect the pH value. After finishing the aging experiment, HPLC purity was tested.

It can be seen from Table 5 that after high-temperature aging with different additive agents, the pH stability of the KN-A vinyl sulfone black dye was quite different, and the HPLC purity was also very different compared to the original dye. On the contrary, for KN-B vinyl sulfone black dye, as long as HEPES and TES were added, the pH value can be relatively stable at 7.4-7.5, and it would not rise. The HPLC purity of TES was lower, but the range is not large.

Please refer to Table 6, an appropriate HEPES additive agent was selected and a simulated spray drying experiment was conducted. After the simulated spray drying was completed, the pH and HPLC purity were also tested. After the simulated spray drying, the pH drop of the three KN-B vinyl sulfone black dyes was relatively close, and the HPLC purity was about 1% lower than the original. Therefore, compared to the aging at 60° C. for 7 days, the simulated spray drying had a smaller influence on the HPLC purity.

Example 3

This embodiment focuses on the formula of additive agents (pH buffer agent) in KN-A and KN-B vinyl sulfone black dye inks. Please refer to the following data.

TABLE 7

KN-A and KN-B vinyl sulfone black dye, CP-
VS, in ink formula I (KN-A-VSI & KN-B-VSI)

| Material | wt. % |
|---|---|
| Proxel GXL (antibacterial agent) | 0.08% |
| Surfynol 465 (surfactant) | 0.59% |
| Ethylene glycol | 19.50% |
| 1,2-propanediol | 9.80% |
| Glycerin | 2.50% |
| CP-VS (KN-A/KN-B powder dye) | 17.74% |
| Deionized water | Balance |
| Total | 100.00% |
| pH value | 5.0-5.5 |
| Conductivity (ms) | 8.0-10.0 |
| Viscosity (at 25° C.) | 7.0-8.0 |
| Surface tension (at 25° C.) | 36.0-37.0 |

TABLE 6

The changes of pH and HPLC purity of 10% vinyl sulfone black dyes KN-A
and KN-B with 0.2% HEPES additive agent after simulated spray drying.

| Sample No. | | pH before spray drying | pH after spray drying | ΔpH | HPLC purity after simulated spray drying | |
|---|---|---|---|---|---|---|
| | | | | | vinyl sulfone | hydroxyethyl sulfone |
| Black CP-VS | KNA-1-9 | 7.51 | 4.52 | 2.99 | 47.4% | 44.7% |
| | KNB-1-9 | 7.50 | 7.43 | 0.07 | 93.2% | 4.8% |
| Black CP-VS03 | KNA-2-10 | 7.52 | 4.66 | 2.86 | 55.1% | 40.8% |
| | KNB-2-10 | 7.51 | 7.45 | 0.06 | 93.8% | 4.7% |
| Black CP-VS04 | KNA-3-11 | 7.50 | 4.19 | 3.31 | 64.0% | 31.9% |
| | KNB-3-11 | 7.51 | 7.44 | 0.07 | 93.5% | 4.6% |

TABLE 8

The pH comparison of the ink (KN-A-VSI) containing buffer
solution of 20% HEPES before and after the aging test

| CP-VS black ink | KN-A | KN-B | KN-A | KN-B | KN-A | KN-B |
|---|---|---|---|---|---|---|
| Addition of 20% HEPES aqueous solution (g) | — | — | 0.73 | 0.10 | 1.42 | 0.2 |
| Adjusted pH value | 5.06 | 7.67 | 5.50 | 7.70 | 5.90 | 7.84 |
| Aging at 60° C. for 7 days | 4.33 | 7.36 | 4.39 | 7.40 | 4.41 | 7.53 |
| Aging at 60° C. for 14 days | 4.21 | 7.28 | 4.10 | 7.31 | 4.09 | 7.36 |
| Aging at 60° C. for 21 days | 4.16 | 7.24 | 3.96 | 7.26 | 3.93 | 7.28 |

From the comparison in Table 8, it can be seen that the pH value of formula I ink, KN-A vinyl sulfone black ink (KN-A-VSI) after high temperature aging for one week, all pH values dropped to about 4.4 and maintained at about 4.0 after aging for 2 to 3 weeks. The KN-B vinyl sulfone black dye ink (KN-B-VSI) with removed sulfate had pH value of 7.67 before adjusting with buffer solution. As the pH increased to 7.84 after three weeks of high temperature aging, pH was maintained between 7.20 and 7.30. As a result, it was estimated that the stable pH value of KN-A-VSI was about 4.0 and there was a risk of corrosion of the nozzles on print-heads. However, the stable pH value of KN-B-VSI was about 7.25 to protect the general nozzles. In addition, 20% HEPES in Table 8 is the weight percentage concentration of additive agent itself.

TABLE 9

KN-A and KN-B vinyl sulfone black dye, CP-VS03,
in ink formula A (KN-A-VS03A & KN-B-VS03A)

| Material | wt. % |
|---|---|
| Proxel GXL (antibacterial agent) | 0.08% |
| Surfynol 465 (surfactant) | 0.59% |
| Ethylene glycol | 19.50% |
| 1,2-propanediol | 9.80% |
| Glycerin | 2.50% |
| CP-VS03 (powder dye) | 17.74% |
| Deionized water | Balance |
| Total | 100.00% |
| pH value | 5.0-5.5 |
| Conductivity (ms) | 8.0-10.0 |
| Viscosity (at 25° C.) | 7.0-8.0 |
| Surface tension (at 25° C.) | 36.0-37.0 |

The embodiment in Table 9 uses sodium acetate ($CH_3COONa$), ammonium acetate ($CH_3COONH_4$), sodium hydroxide (NaOH), disodium hydrogen phosphate ($Na_2HPO_4$), sodium dihydrogen phosphate ($NaH_2PO_4$) and other aqueous solutions as an additive agent. The amount is shown in Table 10 below. The stability of KN-A-VS03A ink and KN-B-VS03A ink is evaluated after adjusting pH value to 5.5 and 7.5, respectively.

TABLE 10

The dosage of various pH adjusters contained in vinyl
sulfone black dye (CP-VS03) in ink formula A

| No. | Additive agent | wt. % |
|---|---|---|
| 1 | N/A | 0.0% |
| 2 | $CH_3COONa$(20%)aq | 0.5% |
| 3 | $CH_3COONH_4$(20%)aq | 0.4% |
| 4 | NaOH(20%)aq | 0.3% |
| 5 | $NaH_2PO_4$(7.5%)aq | 0.3% |
| 6 | $Na_2HPO_4$(7.5%)aq + $NaH_2PO_4$(7.5%)aq | 1.0% |

TABLE 11

The pH changes of inks (KN-A-VS03A & KN-B-VS03A) containing
various pH adjusters after high temperature aging at 60° C.

| No. | CP-VS03 ink | pH before aging | 1st day | 2nd day | 3rd day | 5th day | 7th day | ΔPH |
|---|---|---|---|---|---|---|---|---|
| 1 | KN-A | 5.16 | 5.12 | 5.09 | 5.06 | 5.01 | 4.93 | −0.17 |
|   | KN-B | 7.37 | 7.33 | 7.31 | 7.30 | 7.27 | 7.26 | −0.11 |
| 2 | KN-A | 5.50 | 5.48 | 5.47 | 5.47 | 5.46 | 5.45 | −0.05 |
|   | KN-B | 7.50 | 7.47 | 7.45 | 7.41 | 7.38 | 7.34 | −0.16 |
| 3 | KN-A | 5.50 | 5.46 | 5.43 | 5.39 | 5.38 | 5.36 | −0.14 |
|   | KN-B | 7.50 | 7.43 | 7.36 | 7.32 | 7.29 | 7.27 | −0.23 |
| 4 | KN-A | 5.50 | 4.80 | 4.52 | 4.34 | 4.20 | 4.06 | −1.44 |
|   | KN-B | 7.50 | 7.45 | 7.41 | 7.34 | 7.31 | 7.28 | −0.22 |
| 5 | KN-A | 5.50 | 4.71 | 4.50 | 4.31 | 4.17 | 4.03 | −1.47 |
|   | KN-B | 7.50 | 7.44 | 7.40 | 7.37 | 7.34 | 7.26 | −0.24 |
| 6 | KN-A | 5.50 | 4.86 | 4.55 | 4.36 | 4.20 | 4.18 | −1.32 |
|   | KN-B | 7.50 | 7.46 | 7.43 | 7.40 | 7.35 | 7.29 | −0.21 |

The embodiment of Table 10 added some pH adjuster aqueous solutions in different groups, and adjusted the ink to pH 5.50. Since the number 1 was not adjusted, the KN-A vinyl sulfone black ink (KN-A-VS03A) had pH value of 5.16, and the pH value of KN-B vinyl sulfone black ink (KN-B-VS03A) was 7.37; the % in the left column is the weight percentage concentration of the additive agent itself, and the % in the right column is the weight percentage concentration of the additive agent based on the total weight of the ink. In No. 2-6 of Table 11, each pH value slowly decreased with aging time. Among them, the combination of KN-A-VS03I ink and the additive agents with less change in pH value is No. 2 with sodium acetate ($CH_3COONa$(20%) aq). Its pH value was still above 5 (pH=5.45) on the 7th day, and the pH value of No. 3 ($CH_3COONH_4$(20%)aq) was also above 5 (pH=5.36), which meant that there was still a risk of corrosion of the print-head nozzles. The pH value of ink KN-B-VS03A changed less without adding various additives, but the addition of sodium acetate can maintain the pH value between 7.30 and 7.40 after aging. Other additive agents made pH value of the ink drop to about 7.27 without obvious stabilizing effect. The characteristics of KN-B vinyl sulfone black ink formula A of this embodiment can be applied to general industrial nozzles, such as Konica Minolta, Ricoh, DigiFilm, etc.

TABLE 12

KN-A and KN-B vinyl sulfone black dye, CP-VS04, in ink formula B (KN-A-VS04B & KN-B-VS04B)

| Material | wt. % |
| --- | --- |
| Proxel GXL (antibacterial agent) | 0.08% |
| Surfynol 465 (surfactant) | 0.59% |
| Ethylene glycol | 11.25% |
| 1,2-propanediol | 6.50% |
| Glycerin | 2.75% |
| CP-VS04 (powder dye) | 9.00% |
| Deionized water | Balance |
| Total | 100.00% |
| pH value | 5.0-5.5 |

TABLE 13

KN-A and KN-B vinyl sulfone black dye, CP-VS04, in ink formula C (KN-A-VS04C & KN-B-VS04C)

| Material | wt. % |
| --- | --- |
| Proxel GXLBIT-20 (antibacterial agent) | 0.08% |
| Surfynol 465 (surfactant) | 0.14% |
| Caprolactam | 3.00% |
| Ethylene glycol | 13.50% |
| Glycerin | 5.00% |
| Diethylene glycol | 5.00% |
| CP-VS04 (liquid dye) | 64.10% |
| Deionized water | Balance |
| Total | 100.00% |
| pH value | 5.0-5.5 |
| Conductivity (ms) | 8.0-10.0 |
| Viscosity (take 25° C. as standard) | 6.0-7.0 |
| Surface tension (take 25° C. as standard) | 35.0-36.0 |

TABLE 14

The pH changes of ink KN-A-VS04B, KN-B-VS04B, KN-B-VS04C and KN-B-VS04C containing additive agents after high temperature aging at 60° C.

| No. | CP-VS04 ink | Additive agents | Dosage (g) | pH before aging | Aging at 60° C. for 7 days | | | |
| --- | --- | --- | --- | --- | --- | --- | --- | --- |
| | | | | | pH after aging for 7 days | ΔpH | Cl (ppm) | SO4 (ppm) |
| B | KN-A | 10% Sodium Acetate | 0.13 | 6.00 | 5.36 | −1.14 | 6 | 27 |
| | | 20% HEPES | 1.50 | 6.00 | 4.48 | −1.52 | 8 | 32 |
| | | 20% BES | 1.54 | 6.00 | 4.23 | −1.77 | 11 | 35 |
| | KN-B | 10% Sodium Acetate | 0.27 | 7.50 | 7.46 | −0.04 | 8 | 18 |
| | | 20% HEPES | 0.16 | 7.50 | 7.43 | −.0.07 | 7 | 20 |
| | | 20% BES | 0.20 | 7.50 | 7.42 | −0.08 | 7 | 21 |
| C | KN-A | 10% Sodium Acetate | 0.15 | 6.00 | 5.38 | −1.12 | 6 | 26 |
| | | 20% HEPES | 1.54 | 6.00 | 4.49 | −1.51 | 7 | 33 |
| | | 20% BES | 1.61 | 6.00 | 4.25 | −1.75 | 11 | 34 |
| | KN-B | 10% Sodium Acetate | 0.30 | 7.50 | 7.45 | −0.05 | 5 | 12 |
| | | 20% HEPES | 0.16 | 7.50 | 7.44 | −.0.06 | 7 | 14 |
| | | 20% BES | 0.21 | 7.50 | 7.42 | −0.08 | 6 | 15 |

The embodiments in Tables 12 and 13 used 10% sodium acetate, 20% HEPES, and 20% BES (N,N-bis(2-hydroxyethyl)-2-aminoethanesulfonic acid) aqueous solutions to perform the stability evaluation for inks formula B and C containing KN-A and KN-B vinyl sulfone black dye, CP-VS04, in forms of powder and liquid respectively. After adjusting the pH value of KN-A-VS04 ink to 6.0 and KN-B-VS04 ink to 7.5, the changes in pH, free chloride ion and free sulfate ion were detected.

It can be seen from Table 14 that the pH value of the dye KN-A-VS04 in the ink formula B and C was adjusted by additive agents. After the aging test, the pH value dropped below 5.5, and the chloride ion and sulfate ion were obviously released. However, the dye KN-B-VS04 maintained the pH value between 7.4 and 7.5 in each ink formula. The decline of powder and liquid dyes was almost close, and the concentration of chloride ion and sulfate ion was respectively maintained below 50 ppm, which shows that the dye including these three types of additive agents has obvious stabilizing effect. The characteristics of ink KN-B-VS03B can be applied to mainstream inkjet printheads, such as Epson printhead, while the characteristics of ink KN-B-

VS04C can be applied to major high-speed inkjet printhead, such as Kyocera printhead. In addition, the additive agent % in Table 14 is the weight percentage concentration of the additive agent itself.

All the features disclosed in the specification of the present invention can be combined in any way. The features disclosed in this specification can be replaced by features with the same, equivalent or similar purpose. Therefore, except for the emphasis placed on special statements, the technical feature disclosed in this specification is merely an embodiment of a series of equivalent or similar features.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. A method of manufacturing a reactive composition, comprising:
   (a) dissolving 2-[(4-aminophenyl) sulfonyl]ethanesulfonic acid into water to form a solution;
   (b) introducing excess nitrite or nitrous acid and the solution into hydrochloric acid to form a diazonium salt;
   (c) adding 4-amino-5-hydroxy-2,7-naphthalenedisulfonic acid to react with the diazonium salt;
   (d) adding 7-acetamido-4-hydroxy-2-naphthalenesulfonic acid to react with the diazonium salt;
   (e) adding a first alkaline substance to adjust a pH value, wherein the first alkaline substance is sodium bicarbonate and the pH value is adjusted to 2.0-2.2;
   (f) adding a second alkaline substance to adjust the pH value, wherein the second alkaline substance is sodium carbonate and the pH value is adjusted to 5.2-5.5;
   (g) adding a third alkaline substance to control the pH value, wherein the third alkaline substance is sodium hydroxide and the pH value is controlled no more than 11;
   (h) adding an acidic substance to adjust the pH value, wherein the acidic substance is hydrochloric acid and the pH value is adjusted to 6.0-6.5; and
   (i) adding an additive agent to obtain the reactive composition,
   wherein a reaction temperature of the step (b) is lower than 5° C.,
   wherein the additive agent is acetic acid, sodium hydroxide, acetate, sulfonic acid buffering agent, or a combination thereof.

2. The reactive composition of claim 1, wherein a pH value of the reactive composition is ranged 6.5-7.5.

3. The reactive composition of claim 1, further comprising desalination is performed by filtration, and a membrane separation technology is used to concentrate to a solid content of 10 wt. %, thereby obtaining a refined product of the reactive composition.

4. A method of manufacturing a reactive ink, comprising:
   (a) providing a reactive composition made by the method of claim 1; and
   (b) mixing an antibacterial agent, a surfactant, ethylene glycol, 1,2-propanediol, glycerin, caprolactam, diethylene glycol, a sulfonic acid buffering agent or a combination thereof with the reactive composition to form the reactive ink.

5. The method of manufacturing a reactive ink of claim 4, wherein a pH value of the reactive ink is ranged 7.0-8.0.

6. The method of manufacturing a reactive ink of claim 4, wherein a concentration of free chloride ion and free sulfate ion are respectively lower than 50 ppm.

* * * * *